Feb. 12, 1946. G. M. BOUMPHREY 2,394,744
DRAW BAR OR HITCH FOR AGRICULTURAL IMPLEMENTS
Filed Feb. 1, 1944 2 Sheets-Sheet 1
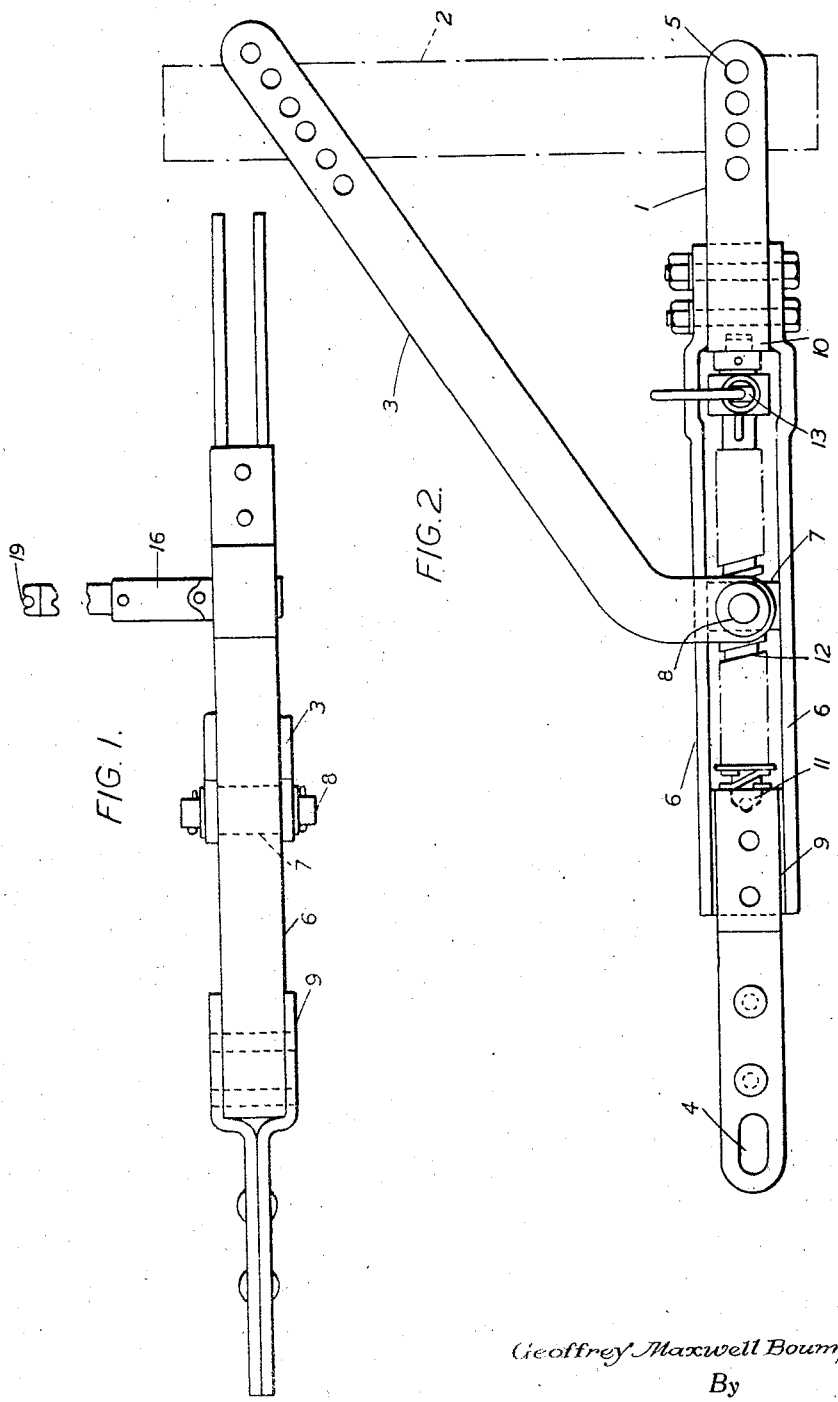
Inventor
Geoffrey Maxwell Boumphrey
By
Munn, Liddy & Glaccum
Attorneys Feb. 12, 1946.     G. M. BOUMPHREY     2,394,744
DRAW BAR OR HITCH FOR AGRICULTURAL IMPLEMENTS
Filed Feb. 1, 1944     2 Sheets-Sheet 2
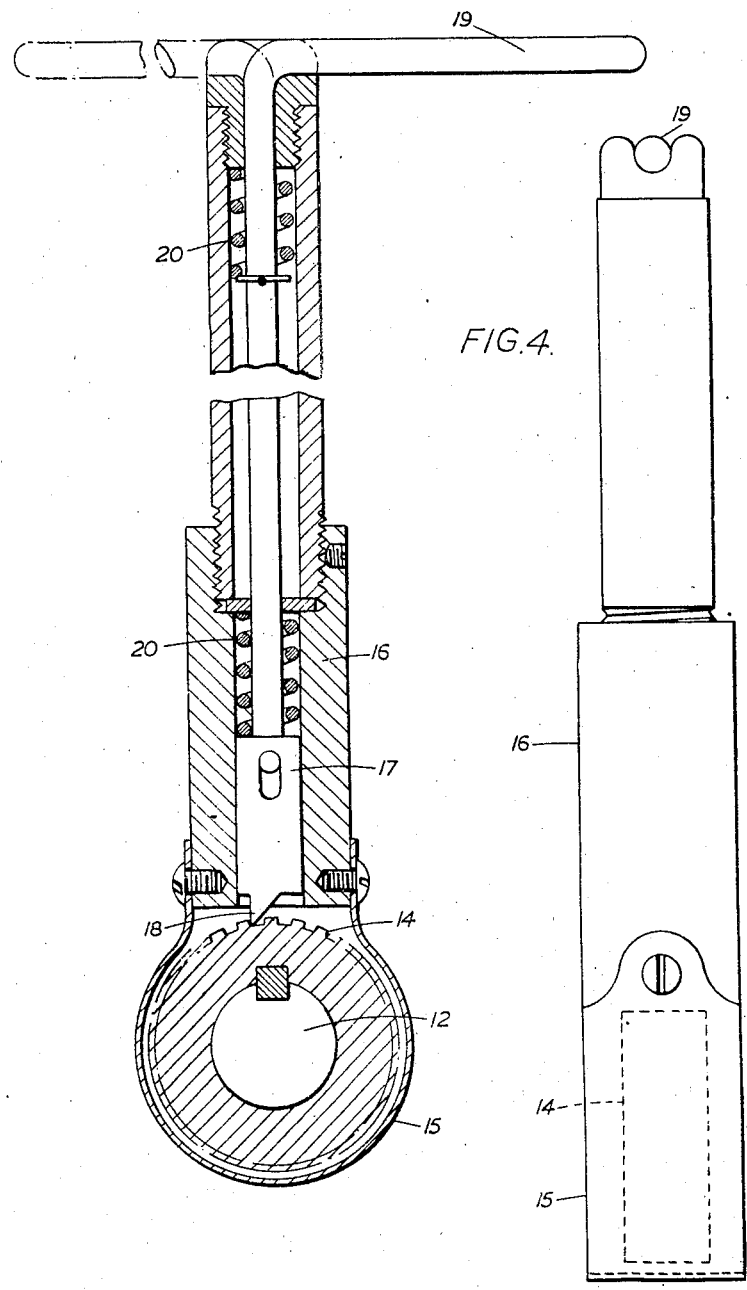
Inventor
Geoffrey Maxwell Boumphrey
By
Munn, Liddy & Glaccum
Attorneys Patented Feb. 12, 1946

2,394,744

UNITED STATES PATENT OFFICE 2,394,744

DRAWBAR OR HITCH FOR AGRICULTURAL IMPLEMENTS

Geoffrey Maxwell Boumphrey, Pershore, England

Application February 1, 1944, Serial No. 520,584
In Great Britain February 26, 1943

1 Claim. (Cl. 280—33.12)

This invention relates to drawbars or hitches used to couple ploughs and other agricultural implements to the power means by which they are drawn, such as a tractor, of the kind having provision for adjusting the angle of draught.

The invention provides improved means by which the angle aforesaid can be satisfactorily adjusted while the implement is working, i. e. without having to stop the tractor or other means of traction.

The invention provides an improved mechanism for adjusting the angle of draught of the kind having a triangular frame, one member of which is transverse to the direction of traction and attached to the implement to be drawn, another of which is substantially in the direction of traction and the third is inclined to both directions, either the second or third member being adjustable in length to vary the angle of draught.

The object of the present invention is to provide a mechanism of the kind above referred to having in combination a mechanism having an operating member which is given a to and fro movement which is operative in one direction and idle in the opposite direction and means whereby the operative and idle directions of movement may be reversed.

With these and other objects in view the invention consists in the improved combinations and arrangements of parts set out in the embodiment which will now be described in relation to the accompanying drawings, the novel features being recited in the claim which follows.

In these drawings:

Figs. 1 and 2 show in elevation and plan, one embodiment of the invention,

Figs. 3 and 4 show on an enlarged scale, a one-way device included in Figs. 1 and 2.

In the arrangement depicted in the drawings, three members are articulated together in a triangular formation, one 1 lying more or less in the direction of travel of the implement, one 2 transverse thereto, and the third 3 inclined to both directions. At the median position of adjustment, the triangle is substantially a right angle one with the base member 2 connected to the plough or other implement, the hypotenuse inclined as aforesaid, and the other side 1 adjustable in effective length to vary the angle.

The adjustable member 1 is invariable as to its overall length and carries the adjusting means intermediate its ends. One end has a slotted hole 4 or other expedient for connecting to the tractor bar, hook, or the like, and the other and rear end has several holes 5 for selective insertion of a coupling pin, said end parts being connected by a pair of spaced limbs 6 which acts as a guide for a nut 7. Integral with the nut are a pair of opposed trunnions 8 on which are journally mounted a pair of spaced links constituting the arm 3 to couple the adjustable member 1 with the transverse member 2.

Between the two spaced limbs 6 and rotatably carried in the two end parts 9, 10, of the adjustable member (conveniently in bearings of footstep or spigot character with interposed ball 11 or other anti-friction device) is a screwed shaft 12 engaging the nut and adapted for rotation in either direction by ratchet and pawl device 13 mounted on one end of the shaft.

Such device shown enlarged in Figs. 3 and 4 includes a toothed wheel 14 keyed or otherwise fixed to the shaft 12, a strap 15 oscillatable on the shaft, a sleeve like lever arm 16 secured to the strap and a pawl member 17 in the lever arm 16. Provision is made whereby the one pawl is selectively brought into action for the turning of the wheel in the direction desired, such for example as by straight-flanked teeth and by the incorporation of the pawl tooth 18 at the lower end of the pawl spindle 17 movable about its axis to present the pawl to the wheel teeth in either of two positions spaced apart angularly by 180°. The spindle 17 is also movable rectilinearly in its sleeve mounting 16 to enable it to be disengaged radially from the wheel 15 and re-engaged after adjustment to the other angular position; this movement is conveniently effected through the agency of a handle 19 at the outer protruding part of the spindle and a coiled spring or springs 20 which hold the pawl tooth in contact with the teeth. Alternatively, two one-way pawls may be used in conjunction with means by which the one or the other can be made operative.

Oscillation of the lever arm produces a to-and-fro motion of the pawl and consequent turning of the screwed shaft in or relative to the nut which is thus either advanced or retrogressed carrying with it the attached end of the hypotenuse member 3 in the line of travel of the machine. The transverse draught bar 2 is turned about its fulcrum point on the adjustable member 1, and the angle of draught varied within the limits of the device to the extent desired while the machine is travelling. The range coverable may be augmented by placing the coupling pins in any one of the several holes provided at each end of the draught bar at the two articulation zones.

The screwed shaft with its one-way device may be enclosed by upper and lower cover plates with slots for movement of the trunnions and the rock lever, with or without sliding covers over the slots, to exclude soil, etc.

The adjusting device may be placed at either end of the adjustable member within reach of the driver for direct actuation, or operated by remote control mechanism similar to that used in connection with the gear shifts of self-propelled vehicles.

I claim:

Means for adjusting the angle of draught during traction of ploughs and other agricultural implements employing a triangular frame, one member of which is transverse to the direction of traction and attached to the implement to be drawn, another of which is substantially in the direction of traction and the third is inclined to both directions, either the second or third member being adjustable in length to vary the angle of draught including means for adjusting the angle of draught having in combination a mechanism having an operating member which is given a to and fro movement which is operative in one direction and idle in the opposite direction, said mechanism including in combination a screwed shaft, a nut engaging the screw and operatively connected to the draught bar or its equivalent, a toothed wheel on said screw, a lever arm journally mounted with respect to the wheel, and pawl means carried on the lever arm for selective engagement with the toothed wheel to enable the angle of draught to be varied in either sense.

GEOFFREY MAXWELL BOUMPHREY.